United States Patent [19]
Kehr

[11] 3,819,560
[45] June 25, 1974

[54] VINYL HALIDE POLYMER/EPOXIDE RESIN POWDER COATING COMPOSITIONS

[75] Inventor: J. Alan Kehr, Saint Paul, Minn.

[73] Assignee: Minnesota Mining and Manufacturing Company, St. Paul, Minn.

[22] Filed: Jan. 6, 1972

[21] Appl. No.: 215,948

[52] U.S. Cl. .................... 260/31.8 M, 260/837 PV
[51] Int. Cl. .......................................... C08f 45/36
[58] Field of Search .... 260/31.8 E, 837 PV, 47 EN, 260/836, 899; 252/384; 161/186

[56] References Cited
UNITED STATES PATENTS

| | | | |
|---|---|---|---|
| 2,245,040 | 6/1941 | Marks | 252/384 |
| 2,847,395 | 8/1958 | Wear | 260/47 EN X |
| 2,965,586 | 12/1960 | Fisch et al. | 260/837 PV |
| 3,294,748 | 12/1966 | Rogers et al. | 260/47 EN |
| 3,383,337 | 5/1968 | Garling et al. | 260/837 PV |
| 3,553,166 | 1/1971 | Anderson et al. | 260/47 EN |
| 3,562,354 | 2/1971 | Golstein | 260/41 B |
| 3,631,150 | 12/1971 | Green | 260/47 EN |

FOREIGN PATENTS OR APPLICATIONS

| | | | |
|---|---|---|---|
| 1,104,274 | 2/1968 | Great Britain | 260/836 |
| 1,255,742 | 12/1971 | Great Britain | |

OTHER PUBLICATIONS

Lee and Neville, "Handbook of Epoxy Resins" TP 1180.E6 L. 4 C. 3.

Primary Examiner—Lewis T. Jacobs
Attorney, Agent, or Firm—Alexander, Sell, Steldt & DeLaHunt

[57] ABSTRACT

The disclosed self-primed vinyl coating compositions are dry powders at room temperature. These powders contain a heat-activatable epoxy adhesive system either absorbed onto the surface of the vinyl powder or otherwise intimately blended therewith. By selecting sufficiently latent co-curatives and catalysts for the adhesive system and blending them with the vinyl, the shelf-life of the composition can be preserved without any loss of the self-priming capability of the composition.

8 Claims, No Drawings

VINYL HALIDE POLYMER/EPOXIDE RESIN POWDER COATING COMPOSITIONS

FIELD OF THE INVENTION

This invention relates to self-primed vinyl powders useful for coating substrates such as metal by a heat fusion process, e.g. flame spraying, electrostatic spraying, or fluidized bed techniques. This invention further relates to the combination of a vinyl powder of low solubility in plasticizers with an epoxy resin and a latent curative and/or latent curative-catalyst. The resulting self-primed vinyl is a free-flowing powder at temperatures up to about 40° C. which remains stable and usable for several months at these temperatures. An aspect of this invention relates to the selection of suitable curatives, i.e., hardeners, which are preferably the dihydrazide, polycarboxylic acid polyanhydride, or dicyandiamide type. Another aspect of this invention relates to the selection of suitable catalysts or curative-catalysts, which preferably contain an amino group rendered latent in some manner, e.g., by coordination of an amine ligand, conversion of the amine to a cation or anion, or otherwise complexing or altering the amino group.

DESCRIPTION OF THE PRIOR ART

Vinyl powders are particularly useful for coating metal substrates or the like, but ordinarily the substrate must be primed to make the vinyl coating tenaciously adherent to its surface. Various additives (e.g. metal salts reactive with diamines or dihydrazides) have been suggested to make the vinyl self-priming or internally-primed and eliminate the need for an external primer (see U.S. Pat. No. 3,562,205, Richart, issued Feb. 9, 1971); but these agents have not as yet gained commercial acceptance. Several prior art disclosures, e.g., British Pat. No. 1,193,896 (Ciba, Ltd.), published June 3, 1970, teach that a vinyl plastisol (a solution of vinyl resin in liquid plasticizer) may be self-priming by adding a curable epoxide system to the plastisol, but plastisols, being liquids, do not readily lend themselves to many of the more convenient fusion coating techniques. The aforementioned British patent appears to contemplate blending unprimed plastisol with the curable epoxide system in a paint mill for use on the job, and does not teach any means or method for making a pre-formulated epoxyprimed vinyl composition which would have sufficient storage stability to be formulated months in advance and used as desired. Referring to the teachings of the self-primed or internally-primed vinyl powder art provides no further insight into the problem, since these teachings do not deal with curable epoxide additives.

In short, the prior art provides no reliable guidelines for formulating substantially dry, free-flowing, powdery blends of vinyl powder, epoxide monomers or prepolymers, co-curatives and/or catalysts for the curing of the epoxide, plus other additives and modifiers, including plasticizers for the vinyl. There are no simple rules of thumb for predicting the behavior of these various materials in a substantially dry, particulate, free-flowing blend, particularly in view of the fact that the requirements of the dry blend include: storage stability, i.e., no premature gelling of the epoxide monomer or prepolymer and no undue agglomeration of the particles, ease of coating, fusing and curing to a tough, water-resistant material bonded to a substrate; the ability to fuse to a smooth coating with little or no foaming or discoloration; sufficient strength of the bond between the substrate and coating to resist peeling; and a variety of desired electrical, chemical, and physical properties of the fused coating, e.g., sufficient elongation and flexibility, hardness, tensile strength, solvent resistance, etc. Furthermore, due regard must be given to the fact that blending of the ingredients of the blend may generate a great deal of heat, liquefying or chemically activating some of the solid ingredients. This complex set of problems is peculiar to the present invention and involves both epoxide chemistry on the one hand and dry, storage stable-fusion coatable vinyl compositions on the other hand.

Accordingly, this invention contemplates a selection of vinyl, epoxide, curative and/or catalytic materials that will provide both the advantages of fusion coatable vinyl powders and self, i.e., internal, epoxide priming. This invention also contemplates minimizing agglomeration of the particles of a self-primed vinyl powder.

SUMMARY OF THE INVENTION

Formulating the vinyl coating compositions of this invention involves the selection of a curable epoxide material which can be absorbed into or taken up by a particulate mass of vinyl to provide an internally-primed vinyl powder that remains substantially dry and free-flowing for weeks or months at temperatures up to about 40° C.; included in the curable epoxide material is an epoxide monomer or prepolymer and a suitable compound or combination of compounds which can assist in polymerizing and curing or crosslinking the epoxide monomer or prepolymer at elevated temperature; these compounds being absorbed into the particulate mass without chemical effect upon the epoxide monomer or prepolymer until the temperature of the particulate mass is increased above 40° C. The vinyl particles used in formulating the coating compositions of this invention have the ability to blend intimately with oily viscous liquids or soft solids, e.g., by adsorbing liquids or easily deformable materials onto their surfaces. These particles preferably comprise a homopolymer of a vinyl halide or copolymers (including terpolymers, etc.) containing a minor amount of other repeating vinyl or vinylidine or acrylic units such as vinyl acetate, acrylonitrile, or the like. The types and amounts of repeating units should be selected to maximize the chemical, physical and electrical properties needed for the particular end use of the coating; vinyl polymers selected for the purposes of this invention are free-flowing powders, preferably those not readily soluble in plasticizers, e.g., in diesters of dicarboxylic acids such as phthalic acid, and are capable of adsorbing, per 100 parts by weight of vinyl powder, up to 35 or 40 parts by weight of plasticizer on particle surfaces without significant agglomeration of particles. (In short, "plastisol grade" vinyl should not be used except in minor amounts.) These particles are in the size range of about 75 – 420 microns, the average size of the particles (numerically and by weight) being in the range of about 100 – 150 microns. A small amount of "plastisol grade" (less than 74 microns in size) or, preferably, "dispersion grade" (less than about 1 micron in particle size) can be used as an anti-agglomeration aid. It is preferred to add a liquid plasticizer to the vinyl powder, which plasticizer is taken up by the vinyl particles in the manner described previously. When optimized, plasticized powdery vinyl compositions of the present invention can have even less tendency to agglomerate due to plasticizer migration than prior art vinyl powder containing similar amounts of adsorbed liquid.

It is both permissible and desirable to blend conventional stabilizers into the free-flowing powdery compositions of this invention. Other conventional ingredients, e.g., pigments, can also be added. The resulting compositions are storage stable for at least one month at temperatures up to 40° C., and accelerated aging tests indicate a useful storage life of perhaps more than 1 year at these temperatures, longer at temperatures below 25° C. Some agglomeration of particles may ocur during this time, but mechanical agitation, shearing, or the like can restore the free-flowing property of the powder. The powder is used in the same manner as conventional powdered vinyl coating materials, typical methods of use being described in the aforementioned U.S. Pat. No. 3,562,205. The resulting coatings have useful properties, as will be described subsequently.

DETAILED DESCRIPTION AND EXAMPLES

The vinyl powder used in the present invention comprises the major portion of the compositions described in detail hereinafter. For this reason, it is convenient to determine the amounts of the other components of these compositions, i.e., epoxides, curing agents, plasticizer, etc., in terms of parts by weight per 100 parts by weight vinyl, hereinafter abbreviated "phr." The amount of epoxide monomer should be at least 1.0, preferably at least 5 phr, but generally need not exceed about 60 phr, even for high equivalent weight epoxides. Liquid or semi-liquid epoxide monomers can have some plasticizing effect upon the vinyl, but it is preferred to include up to about 60 phr of plasticizer; generally 5 – 35 phr of plasticizer will help provide a fused vinyl coating with some rubbery properties. Co-curatives i.e., polyfunctional curing or crosslinking agents, used with the epoxide monomer or prepolymer can be used in approximately stoichiometric amounts or less, e.g. 0.2 – 2.0, preferably 0.4 – 1.0 equivalent of curing agent per epoxy equivalent, the only advantage being gained from any substantial excess over stoichiometry being increased speed. In fact, excessive curing agent can cause foaming and discoloration of a fused coating. Catalysts such as metal salt imidazoles and metal salt imidazolates are effective initiators for the epoxide/curing agent reaction if present in catalytic, i.e., substantially less than stoichiometric, amounts. Amounts in excess of 5 phr or even in excess of 1.0 phr appear to be unnecessary, even when the amount of epoxide is over 30 phr; accordingly, the amount of catalyst used is preferably kept below one phr to provide heat stability.

The total amount of additives, e.g. stabilizers (preferably organometallic or epoxidized compounds used to minimize adverse effects of HCl split out during heating of vinyl chloride polymers), pigments, extenders, etc. preferably amounts to less than 100 phr; the amount of stabilizer, for example, need not normally exceed about 25 phr. The preferred stabilizers are liquids but do not appear to interfere with the storage stability or effectiveness of the composition if used in limited amounts. Preferred extenders and fillers are solids, e.g. silica, calcium carbonate, and the like.

The vinyl materials preferred for use in this invention are solid polymer in the form of white powders. Less than 1 percent (by weight) of particles in these powders are larger than 400 microns in size, and less than about 10 percent are larger than 150 microns. Normally, at least 50 percent of the powder comprises particles larger than 100 microns. The vinyl polymer is preferably a homopolymer consisting essentially of repeating units of the formula —$CH_2$—$CHX$—, where X is halogen, preferably chlorine. The other permissible repeating units, such as vinyl acetate, are present in minor amounts (well below 25 mole percent), so that the resulting copolymer is not easily soluble in plasticizer. As pointed out previously, it is preferred to select a homopolymer or copolymer which will absorb, adsorb, or otherwise take up plasticizer without excessive agglomeration of polymer particles. Vinyl powders conventionally used in fusion coating techniques have this absorptive capacity. Other preferred properties of the powdery polymer include good dry blend properties, rapid fusion rate in the presence of plasticizer at temperatures above 235° C., low to intermediate molecular weight, and low apparent density, e.g., less than 1 g/cc.. The low apparent density is indicative of a large apparent volume, since the specific gravity of a vinyl chloride homopolymer is about 1.4. It is a typical practice in the vinyl art to indicate the molecular weight of the polymer in terms of specific and relative viscosity measurements. Specific viscosity is measured at, for example, 30° C. on 0.4 gram of polymer dissolved in 100 ml. of nitrobenzene. Relative viscosity is measured at 25° C. or 30° C. on 1 percent cyclohexanone solutions. Examples of preferred commercially available materials include "PVC-33" (trade designation of Diamond Shamrock Corporation) and "RUCON" B-28 and B-34 (trade designation of Ruco Division of Hooker Chemical Corporation). These commercial materials take up plasticizer very efficiently and contain less than 1 percent volatiles. "RUCON" B-28 and B-34 have been reported to have relative viscosities (1 percent encyclohexanone, 25° C.) of 1.98 and 2,23, respectively; the specific viscosity of "PVC-33" is reported to be 0.70 (1 percent cyclohexanone solution, 30° C.). The lower limit of molecular weight is reached when the vinyl powder no longer takes up plasticizer efficiently. The upper limit of molecular weight is reached when the vinyl coating composition fails to flow smoothly onto a substrate during the coating operation.

The free flowing character of the vinyl powder can be improved through the addition of a minor amount (less than 25 and preferably less than 10 phr) of a finely divided vinyl powder as an anti-agglomeration agent. The preferred vinyl additive is a "dispersion grade" vinyl such as "PVC-73" (trade designation of Diamond Shamrock Corporation), which has a particle size on the order of 0.1 to 0.2 microns, a specific viscosity (1 percent cyclohexanone solution at 30° C.) of 1.75 – 1.85, and an average apparent density of less than 0.3 g/cc. Though less preferred, "plastisol grade" vinyl has been used as an anti-agglomeration agent, indicating that the particle size of this agent need not be in the sub-micron range and can be increased up to 74 microns.

The finely divided vinyl should, in any event, be considered an agent used in addition to but not in lieu of the relatively coarse, plasticizer-absorptive vinyl; hence, amounts of this vinyl additive are indicated in phr based on 100 parts of the coarse vinyl, and generally exceed 0.5 phr.

The epoxy adhesive system used in this invention comprises a curable epoxide monomer or prepolymer combined with a latent curative which may or may not have the ability to catalyze or initiate the opening of the epoxide (oxirane) ring at elevated temperatures. In the event that the curative lacks this catalytic property, it is not necessary to add a catalyst, i.e., initiator, or curative-catalyst to the epoxy system. The addition of the catalytic agent is nevertheless preferred as a means for reducing post cure times, i.e. the heat treatment following the fusion coating step.

The curable epoxide used in this invention is selected from the group consisting of: (a) a polyglycidyl ether of a polyhydric aliphatic alcohol or a polyhydric phenol, and (b) a cycloaliphatic epoxide. The polyglycidyl ether is a mixture of compounds of the formula

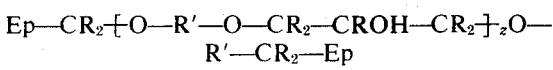

wherein:
Ep is an epoxide ring,
R is hydrogen or a non-hindering aliphatic group, e.g. methyl,
R' is a divalent aliphatic or aromatic radical, and
z is a number from 0 to about 5.

These polyglycidyl ether epoxies are reaction products of polyhydric phenols or polyhydric aliphatic alcohols and epichlorohydrin or a similar 1,2-epoxy-containing monomer having a halogen located on the carbon alpha to the oxirane ring. In short, the compounds of the foregoing Formula are polyglycidyl ethers derived from polyhydroxy aromatic or aliphatic starting materials, e.g. resorcinol, bisphenol-type compounds such as bisphenol A, 1,4-butane diol, etc. The epoxide monomers preferred for use in this invention are described in detail in U.S. Pat. Nos. 3,018,262 and 3,553,166 and in Lee et al., *Handbook of Epoxy Resins*, McGraw-Hill, New York (1967).

The cycloaliphatic epoxies preferred for use in this invention preferably contain at least one 5- or 6-membered carbocyclic ring (or heterocyclic ring with equivalent properties) on which is substituted the epoxide functional group. Substitution of the epoxide group can be provided, for example, by epoxidization of a carbon-carbon double bond in the ring. Typical cycloaliphatic epoxies include vinyl cyclohexene dioxide, bis(2,3-epoxycyclopentyl) ether, dipentenedioxide, and epoxies of the type having ester- or ether-containing side chains or bridges between independent ring systems, e.g. the epoxycyclohexane carboxylates. Commercially available cycloaliphatic epoxies comprising independent rings joined by bridging radicals include 3,4-epoxycyclohexylmethyl-3,4-epoxycyclohexane carboxylate (e.g. "ERL-4221"); 3,-4-epoxy-6-methylcyclohexylmethyl-3,4-epoxy-6-methylcyclohexane carboxylate (e.g. "ERL-4201), bis-(3,4-epoxy-6-methylcyclohexylmethyl) adipate (e.g. "ERL-4289"), and 3,4-epoxy-2-methylcyclohexylmethyl-3,4-epoxy-2-methylcyclohexane carboxylate. The "ERL" designation is a trade designation of Union Carbide Plastics Division. For a more detailed description of cycloaliphatic epoxies of this nature, reference is made to U.S. Pat. No. 3,117,099. It is permissible and may be desirable to use blends of the aforementioned epoxies with each other and with epoxy-containing flexibilizers (e.g. "ERRA 4090," trade designation of Union Carbide) or with epoxidized vegetable oils. It should be noted, however, that epoxidized vegetable oils alone do not provide a curable epoxy system with internal priming capability.

The curative materials used in this invention exhibit little or no interaction with any of the previously described epoxide materials at least at room temperature, and preferably at least up to 40° C. However, at elevated temperatures these curative materials react with the epoxies to produce a tough, thermoset solid. Some curative materials have the ability to catalyze or initiate the opening of the epoxide ring, but such catalytic action is not absolutely essential to this invention, since the epoxies can be thermally activated under fusion coating conditions, i.e., at temperatures above 200° C. Since any curative, whether catalytic or not, forms a reaction product with the epoxide, larger than catalytic amounts of curative should be used to obtain true curing as well as simple polymerization of the epoxies. When optimized, the amount of curative used provides a good balance between stoichiometric requirements and undesirable side effects such as foaming, discoloration, and the like.

The preferred curatives contain the hydrazide function ($-CO-NH-NH_2$ or a similar active hydrogen-containing derivative thereof) and are preferably aliphatic dihydrazides such as azelaic or adipic dihydrazide. These curatives are truly latent at temperatures up to at least 40° C., but at temperatures above 200° C. they react vigorously with thermally-activated epoxide rings. (The dihydrazides do not catalyze the opening of the epoxide ring.) The properties of the fused, internally-primed vinyl coating obtained when dihydrazide-type curatives are used are particularly good. Adhesion to the substrates and resistance to hot water are excellent, and electrical properties are good.

Another suitable type of curative, also latent in the stated temperature range but vigorously reactive at elevated temperatures, is dicyandiamide or a derivative thereof. Typical examples of curatives of the dicyandiamide type are disclosed in U.S. Pat. No. 3,553,166 (Anderson et al.), issued Jan. 5, 1971.

A less preferred but operative class of curatives are the polyacid anhydrides of polycarboxylic acids, e.g. tetrahydrophthalic dianhydride, less preferably hexahydrophthalic dianhydride, trimellitic anhydride, or benzophenone tetracarboxylic dianhydride.

Free polyamines, e.g. methylene dianiline, should not be used, either for their catalytic or curative effects. Similarly, free imidazoles should not be used, even imidazoles substituted with sterically hindering or resonance-inducing groups such as branched-chain alkyls and/or phenyls.

A latent curative-catalyst can be used in addition to, or in lieu of, one of the previously described curatives, provided that premature curing or catalytic effects do not occur at temperatures below 40° C. However, optimum ultimate properties of the cured and fused vinyl coating are obtained when either a latent curative-catalyst or a latent catalyst per se is used in combination with a curative. Suitable curative-catalysts are
 (a) a metal chelate of polyamine,
 (b) an amine-acid salt such as a protonated imidazole, and
 (c) a metal salt-imidazole. Suitable metal chelates of polyamines are disclosed in U.S. Pat. Nos. 2,819,233 and 3,287,303. These chelates, which release the polyamine thermally or by addition of water, are generally less suitable for this invention than the metal salt imidazoles, e.g. the compounds of U.S. Pat. No. 3,553,166, which appear to be truly latent even at temperatures as high as 100° C. The amine-acid salts, i.e., protonated amines (e.g. the protonated imidazoles disclosed in U.S. Pat. No. 3,356,645) are also less suitable, since the salt may spontaneously dissociate at room temperature. The latency of these latent curative-catalysts is, in any event, destroyed or reversed at conventional fusion coating temperatures, i.e., above 200° C. Preferred metal salt-imidazole catalysts are derived from imidazole itself or its 2-, 4-, and/or 5-substituted derivatives and metal salts of Ni(II), Cu(I), Cu(II), Co(II), and the like. One or more of the imidazole ligands can be replaced with other ligands such as dicyandiamides. The salts can be chlorides, sulfates, or the like and typically have co-ordination numbers ranging from 2 to 8.

A preferred example of a "latent catalyst per se" is a metal imidazolate, i.e., $M^{+m}$ $(C_3N_2R_3^-)_m$, where $m$ is the valence of the metal, M, and R is hydrogen or a 2,4-, and/or 5-substituent such as lower alkyl. Suitable metal cations include nickel (II), copper (II), copper (I), zinc (II), silver (I), cadmium (II), mercury (II) and cobalt (II), and suitable imidazole anions are derived from imidazole itself, benzimidazole, 2-alkylimidazoles, 2,4-dialkylimidazoles, and other imidazoles substituted at the 2,- 4,- and/or 5-positions with substituents known in the art; see the aforementioned U.S. Pat. Nos. 3,553,166 and 3,356,645. These compounds are called latent catalysts per se, because they provide no curative effect, even at elevated temperatures. The principal effect, provided by these catalysts is a marked acceleration of the opening of the epoxide ring, a reaction which can be initiated more slowly by thermal means. To provide curing, these ring-opening catalysts or accelerators should be combined with one of the previously described curatives. This lack of curative effect is not disadvantageous; the preferred epoxide systems of this invention generally include a curative in any event. The aforementioned metal imidazolates are truly latent catalysts and do not affect the epoxide ring at temperatures below about 100° C. At higher temperatures, however, they are efficient catalysts and are particularly suited for use in this invention. Two advantages of the metal imidazolates are that they are easier to synthesize and their stoichiometry requires fewer moles of imidazole per mole of metal ion.

Non-latent catalysts (e.g. benzyldimethylamine, boron trifluoride, etc.) should not be used in this invention.

It is also within the scope of this invention to provide curatives such as dicyandiamide in the form of ligands coordinated with a metal salt.

The optimum curable epoxy systems blended with the vinyl powder compositions of this invention thus comprise: (1) a polyglycidyl ether and/or cycloaliphatic epoxide, preferably having an average epoxide functionality of about 2 or 3 (an impure epoxide or epoxide mixture can have a functionality of, for example, 1.7 - 2.5), (2) a latent curative, and (3) latent catalyst (or latent curative-catalyst). The epoxy system, like the plasticizer, is taken up by the vinyl powder and does not inhibit the free-flowing properties of the vinyl coating composition. Although the epoxy system is a "one-part" (complete, preblended system, it is latent at temperatures up to at least 40° C. for a period of months. The convenience of a one-part system is significant in this context, and two-part systems (wherein one or more of components (1), (2), or (3) are omitted and blended with a separate batch of vinyl powder, the two batches of powder being dry blended prior to use) are permissible but not preferred. For example, a suitable Part A of a two-part system could be vinyl powder with plasticizer, epoxide, and catalyst absorbed thereon, the Part B powder containing the curative.

The plasticizers preferred for use in this invention are oily organic liquid esters, e.g., diesters of dicarboxylic acids. Other suitable types of oily liquid esters can be obtained from vegetable oils, i.e., esters of glycerin and aliphatic unsaturated carboxylic acids of six to 24 carbon atoms, e.g. soybean oil. One type of commercially avialable stabilizing plasticizer (e.g., "Paraplex" G-62, trade designation of Rohm and Haas) comprises an epoxidized soybean oil. The purpose of the epoxide groups in a stabilizing plasticizer is to scavenge contaminants or the like, not to provide a curable epoxide system. Certain of the "Monoplex" plasticizers (also a trade designation of Rohm and Haas) also provide a stabilizing effect. It is preferred, however, to provide or augment the stabilizing effect (particularly stabilization against heat and light and against HC1 contamination) with organometallic compounds such as organotin maleate and sulfur-containing organotin compounds (see, for example, U.S. Patent 3,027,350, Mack et al., issued Mar. 27, 1962). The most effective organotin compounds are liquids (e.g. the "Thermolite" series, trade designation of M & T Chemicals, Inc., particularly Nos. "13", "20", and "42") which can be used in amounts less than 10 phr, preferably 1 - 5 phr. The barium-cadmium type of stabilizers are also operative, but less preferred.

The preferred diester-type plasticizers are esters of alkanols of one to 18 carbons and aromatic or aliphatic dicarboxylic acids, e.g. dialkyl phthalates, sebacates, and adipates. These plasticizers also provide a convenient medium for the addition of pigment dispersions to change the color of the vinyl from white to any desired color, e.g., black, green, etc.

The vinyl coating compositions of this invention can be coated onto a substrate and fused to an adherent, smooth coating by conventional fusion coating methods, e.g., fluidized bed techniques, flocking, electrostatic spraying, flame spraying, etc. In the conventional fluidized bed method, the bed is substantially at room temperature but the substrate (typically a metal article such as a pipe) is already hot when inserted in the bed. The temperature of the substrate is over 200° C., preferably about 235 to about 300° C., and the dwell time in the bed is about 1 - 50 seconds, depending on the rate of buildup of coating and the coating thickness desired, typical coating thicknesses being 25 - 1500 microns, preferably 10 - 40 mils (0.25 - 1.0 mm). A post cure, following the coating step, will insure effective internal priming and a tenacious bond between the vinyl and the substrate. Post cure times of 5 seconds to 5 minutes are generally used, the length of time depending on the temperature and the nature of the epoxide system; short cure times (less than 1 minute) being particularly necessary with temperatures approaching 290° C. With temperatures as low as 220° C., cure times of 2 or 3 minutes may be necessary to provide good adhesion.

The following non-limiting Examples illustrate the preferred practice of this invention. All parts are by weight unless otherwise indicated.

EXAMPLES 1 – 17

In these Examples, various combinations of the following materials were used:

Fusion coatable polyvinyl chloride powder

"DIAMOND PVC-33" (trade designation of Diamond Shamrock Corporation for minus 40 U.S. mesh low molecular weight polyvinyl chloride homopolymer; volatiles content: less than 1 percent; specific viscosity [1 percent cyclohexanone solution at 30° C.]:0.70).

"Dispersion grade" polyvinyl chloride powder

"DIAMOND PVC-73" (trade designation of Diamond Shamrock Corporation for polyvinyl chloride powder having a particle size of less than 1 micron; maximum volatiles: 0.4 percent; specific viscosity [1 percent cyclohexane solution at 30° C.]: 1.75 – 1.85).

Plasticizers

"PARAPLEX" G-62 (trade designation of Rohm and Haas Company for epoxidized soybean oil).

"MONOPLEX" S-75 (trade designation of Rohm and Haas Company for monomeric epoxide-ester stabilizing plasticizer). "SANTICIZER" 711 (trade designation of Monsanto Company for substantially non-toxic plasticizer, density at 25°C. : 0.968 g/cc; viscosity at 25° C. : 44 centistokes).

Di-octyl phthalate, hereinafter abbreviated DOP. bisphenol

Stabilizer

Organotin maleate, a liquid stabilizer having dienophilic properties ("THERMOLITE" 31, trade designation of M & T Chemicals, Inc.).

Epoxide Monomer capable of curing to a thermoset solid

"EPON" 828 (trade designation of Shell Chemical Co. for a liquid diglycidyl ether of bisphenol A with a functionality slightly less than the theoretical 2.0 and an equivalent weight slightly larger than the theoretical 170.)

"ERL-4221" (trade designation of Union Carbide Corp. for 3,4-epoxycyclohexylmethyl-3,4-epoxycyclohexane carboxylate).

"EPON" 1002 (trade designation of Shell Chemical Co. for a solid polyglycidyl ether of bisphenol A having an equivalent weight of about 550 – 675).

Curatives (cross-linking agents)
Adipic dihydrazide
Azelaic dihydrazide
Dicyandiamide
Tetrahydrophthalic dianhydride, hereinafter abbreviated THPA.

(Isophthalic dihydrazide and mixtures of isophthalic dihydrazide and dicyandiamide were investigated and found to be less desirable than the aliphatic dihydrazides.)

Catalysts (initiators or accelerators)
$NiCl_2$(imidazole)$_6$ (curative-catalyst)
Nickel imidazolate, i.e. $Ni^{++}(C_3N_2H_3^-)_2$ (catalyst only)

EXAMPLE 1 (Control)

A Waring blender was used to make a laboratory batch. After all the liquid plasticizers and stabilizers were weighed out and mixed together into a single liquid component, the minus 40 mesh vinyl powder ("DIAMOND PVC-33", described previously) was poured into the blender. The blender was then started and the liquid component was slowly added over a period of one minute. Mixing of the dry and liquid components was aided by pushing back vinyl powder down from the walls of the blender with a spatula. Frictional heat during the blending step raised the temperature of the blend into the 200°–230° F. (95°–110° C.) range, at which time the blend began to become dry, fluffy, and freeflowing. At this point the blend was spread onto a pan and allowed to cool to room temperature. After cooling, the blend was dry, but agglomerated. Further blending for 60 seconds with the previously described dispersion grade vinyl reduced the agglomerates to a relatively small amount of material which could be easily removed by screening the blend through a 45 mesh (U.S. Standard) sieve. The dry, free-flowing, fusion-coatable blend had the following composition:

| | Parts by Weight |
|---|---|
| Polyvinyl chloride powder, minus 40 (U.S.) mesh | 100 |
| "Dispersion grade" vinyl | 5.6 |
| Organotin maleate stabilizer | 3.4 |
| Epoxidized soybean oil plasticizer | 4.0 |
| Monomeric epoxide-ester stabilizing plasticizer | 20.0 |

A small (3 X 3 X 1/8 inch) sandblasted, degreased steel panel was preheated and coated to an average thickness of about 300 microns in a fluidized bed. The fusion-coated panel was then placed in an oven heated to 500° F. (260° C.) for 2 minutes, removed from the oven, and allowed to cool. Parallel cuts were then made in the coating and the coating was then peeled from the substrate. It was found that the coating came off very easily, exhibiting virtually no adhesion to the substrate. In the succeeding Examples, adhesion is rated Excellent if the coating could not be removed from the substrate after making the parallel cuts. A rating of Good indicates that the coating could be removed only with difficulty, indicating fairly strong adhesion to the substrate.

EXAMPLES 2 – 5

The composition of Example 1 was dry blended as in Example 1, except that curable epoxide systems were added to the blend, as follows:

| | PARTS BY WEIGHT | | | |
|---|---|---|---|---|
| | Ex. 2 | Ex. 3 | Ex. 4 | Ex. 5 |
| Diglycidyl ether of bisphenol A (liquid) | 21.4 | 21.4 | 21 | 21 |
| Adipic dihydrazide | 2.7 | 2.7 | 2.7 | None |
| $NiCl_2$(imidazole)$_6$ | 0.11 | 0.21 | 0.16 | 0.16 |
| Azelaic dihydrazide | None | None | None | 3.0 |

Fusion coating as in Example 1 was followed by a post cure step in an oven heated to 500° F. (260° C.). The cut-and-peel test described in Example 1 indicated that Excellent adhesion was obtained after only 45 seconds of the 260° C. post cure. The coating was discolored and opacified somewhat by the post cure treatment, but foaming of the coating was apparent only upon microscopic examination. The discoloration was not considered serious enough to be noticeable in many commercial applications in which a dark pigment is added to the vinyl. Immersion in boiling water for four hours and in a high humidity admosphere for 7 days did not destroy the adhesion. After imposing a 1.5 volt cathodic potential for 30 days in an aqueous saline environment, a resistance to disbonding comparable to that of a cured epoxide coating containing no vinyl was observed.

It was found that the formulation of Examples 4 to 5 could be scaled up to 35 to 40 kg. batches without difficulty. In the scale-up runs, each "part" weighed one-half pound or 227 grams and a Henschel mixer was used in place of the Waring blender. In a typical run 2.4 parts of pigment dispersion were added, the dispersing medium being dioctyl phthalate. It was also found that dioctyl phthalate could be substituted for the monomeric stabilizing plasticizer and epoxidized soybean oil with no apparent adverse effect. Good results were also obtained by substituting nickel (II) imidazolate or copper (II) imidazolate or zinc (II) imidazolate for the nickel chloride-imidazole.

EXAMPLE 6

In this Example, the following dry blend was used to investigate the optimum azelaic dihydrazide level:

|  | Parts by Weight |
|---|---|
| Polyvinyl chloride powder, minus 40 (U.S.) mesh | 100.0 |
| "Dispersion grade" vinyl | 5.6 |
| Organotin maleate stabilizer | 3.4 |
| Epoxidized soybean oil plasticizer | 4.0 |
| "SANTICIZER 711" (plasticizer) | 20.0 |
| Liquid diglycidyl ether of bisphenol A (epoxide) | 21.0 |
| Nickel chloride-imidazole | 0.16 |
| Azelaic dihydrazide | varied from 1.0 to 4.0 |

The cut-and-peel adhesion test described in Example 1 was used to determine the difference in effect, if any, attributable to the varied amounts of the dihydrazide. Post cures were carried out at 260° C. Results were as follows:

| Amount of Azeleaic Dihydrazide (Parts by Weight) | Post Cure Time to Provide "Excellent" Adhesion (Seconds) |
|---|---|
| 1.0 | 45 |
| 2.0 | 30 |
| 3.0 | 30 |
| 4.0 | 30 |

Some yellowing was observed with each of the above cures. Yellowing was reduced by using 20 second cure times, and adhesion was then found to be reduced also, but still significant.

EXAMPLES 7 - 10

In these Examples, both the amount of the diglycidyl ether of bisphenol A (the liquid epoxide) and the amount of azelaic dihydrazide were varied. The formulation of Example 6 was used except for these variations, which were as follows:

| Example | Azelaic Dihydrazide, Parts by Weight | Liquid Epoxide (see Ex. 6) - Parts by Weight |
|---|---|---|
| 7 | 1.4 | 10 |
| 8 | 4.3 | 30 |
| 9 | 5.6 | 40 |
| 10 | 7.1 | 50 |

All of Examples 7 – 10, when tested by the method of Example 1, provided Excellent adhesion with 30 – 60 seconds of post curing at 260° C.

EXAMPLE 11

In this Example, the formulation of Example 4 was used except that the cycloaliphatic epoxide ("ERL-4221," trade designation of Union Carbide) was used in place of the liquid diglycidyl ether of bisphenol A. The same number of parts by weight (21.0) of the cyclo aliphatic epoxide were used. Excellent adhesion was obtained (test method of Example 1) after 2 minutes of post curing at 260° C., and the coatings remained adherent under dry conditions. In the boiling water test, however, the coating failed to retain adherence. After 4 hours immersion time, even the coating above the water line lost adherence.

EXAMPLE 12

The following formulation was found to blend well and provide Excellent adherence after post cure (2 minutes at 260° C.) even though the epoxide was not a liquid at room temperature:

|  | Parts by Weight |
|---|---|
| Polyvinyl chloride powder, minus 40 (U.S.) mesh | 100 |
| "Dispersion grade" vinyl | 6.2 |
| Organotin maleate stabilizer | 3.0 |
| DOP (plasticizer) | 22.0 |
| Solid polyglycidyl ether of bisphenol A, e.g., wt. 550–675 | 21.0 |
| Nickel (II) imidazolate | 0.16 |
| Azelaic dihydrazide | 3.5 |

EXAMPLE 13

In this Example the formulation of Example 4 was used, except that 1.2 parts of dicyandiamide were substituted for the 2.7 parts of adipic dihydrazide. Excellent adhesion (Example 1 best) was obtained after 60 seconds of post curing at 260° C. Discoloration of the coating was slight. However, the resulting adherent coating did not have as much resistance to humidity or boiling water as the dihydrazide-cured samples. The resistance to the aqueous salt solution environment, however, was almost as good as that obtained with a dihydrazide cure.

EXAMPLE 14

The formulation in this Example was the same as that of Example 12 except that the liquid diglycidyl ether was used (but in the same amount by weight) and 6.0 parts of tetrahydrophthalic anhydride were used instead of the 3.5 parts of azelaic dihydrazide. Excellent adhesion was obtained after less than 2 minutes of post curing at 260° C., but discoloration was quite noticeable even after 90 seconds of post curing.

EXAMPLES 15 – 17

For these Examples, the following blends were prepared:

|  | Ex. 15 | Ex. 16 | Ex. 17 |
|---|---|---|---|
| Polyvinyl chloride powder, minus 40 (U.S.) mesh | 100 | 100 | 100 |
| "Dispersion grade" vinyl | 5.6 | 5.6 | 5.6 |
| Organotin maleate stabilizer | 3.4 | 3.4 | 3.4 |
| Monomeric stabilizing plasticizer | 20 | 41 | 20 |
| Liquid diglycidyl ether of bisphenol A | 21 | 0.0 | 21 |
| Adipic dihydrazide | 0.0 | 2.7 | 2.7 |
| Nickel chloride-imidazole | 0.13 | 0.13 | 0.0 |

Examples 15 and 17 provided Excellent adhesion after 3 minutes of post curing at 260° C., indicating that curing could be obtained with either the curative-catalyst or the dihydrazide curative alone, but the coating obtained with the catalytic curative (Example 15) had very poor resistance to boiling water and humidity. The coating obtained from Example 16 did not adhere to the substrate, its performance being similar to the control sample (Example 1).

In all of the preceding Examples in which the vinyl coating composition was not pigmented, microscopic examination (60 diameter magnification) did not reveal any segregation of cured epoxide and fused vinyl. Accordingly, it was concluded that the cured epoxide was uniformly distributed throughout the fused vinyl, either as a compatible component or a very finely dispersed phase.

What is claimed is:

1. A free flowing, intimately admixed dry blend consisting essentially of (1) 100 parts by weight of a free flowing, particulate vinyl halide polymer having an average particle size larger than 75 microns but smaller than 420 microns and capable of absorbing at least 35 parts of plasticizer on particle surfaces without significant agglomeration of particles, (2) 1–60 parts of a curable epoxide and selected from (a) a polyglycidyl ether of a polyhydric aliphatic alcohol or a polyhydric phenol and (b) a cycloaliphatic epoxide, (3) up to 60 parts of a plasticizer for said vinyl halide polymer, and (4) up to 25 parts of an anti-agglomeration agent comprising a vinyl powder less than 74 microns in size, characterized by the feature that the blend includes a catalytic amount, but not more than one part, of a latent catalyst selected from
   a. a metal chelate of polyamine,
   b. a protonated imidazole,
   c. a metal salt imidazole complex, and
   d. a metal imidazolate
   and where the catalyst is a metal imidazolate, the blend also contains 0.2–2.0 equivalents, per equivalent of said epoxide, of a curing agent for the epoxide, which curing agent is selected from the group consisting of a dihydrazide, a polyacid anhydride of a polycarboxylic acid, and dicyandiamide or a derivative thereof.

2. A free flowing dry blend as defined in claim 1 coated and adhered to a metal substrate, the resulting coating comprising said epoxide, cured by said curing agent, uniformly distributed through said coating.

3. A free flowing dry blend as defined in claim 1 wherein the catalyst is a metal salt-imidazole and the blend also includes 0.2–2.0 equivalents, per equivalent of said epoxide, of a curing agent for the epoxide, which curing agent is selected from the group consisting of a dihydrazide, a polyacid anhydride of a carboxylic acid, and dicyandiamide or a derivative thereof.

4. A free flowing dry blend as defined in claim 3 wherein said curing agent is a dihydrazide.

5. A free flowing dry blend as defined in claim 1 wherein the catalyst is nickel chloride-imidazole.

6. A free flowing, intimately admixed dry blend consisting essentially of:
   a free flowing, particulate polyvinyl chloride homopolymer having an average particle size in the range of 100–150 microns and capable of absorbing at least 35 parts of plasticizer on particle surfaces without significant agglomeration of particles,
   5–30 parts by weight, per 100 parts by weight of said free flowing, particulate polyvinyl chloride homopolymer, of a polyglycidyl ether of bisphenol A having an epoxide functionality in the range of 1.7–2.5,
   5–35 parts by weight, per 100 parts by weight of said free flowing, particulate polyvinyl chloride homopolymer, of an oily liquid plasticizer comprising a diester of an alkanol of one to 18 carbon atoms or a dicarboxylic acid, said oily liquid plasticizer being absorbed into said free flowing particulate polyvinyl chloride homopolymer,
   a catalytic amount, not exceeding about one part by weight per 100 parts by weight of said free flowing particulate polyvinyl chloride homopolymer, of a metal salt-imidazole catalyst, 1–10 parts, per 100 parts by weight of said free flowing particulate polyvinyl chloride homopolymer, of an organometallic vinyl stabilizer, and
   0.5–10 parts by weight, per 100 parts by weight of said free flowing polyvinyl chloride homopolymer, of an anti-agglomerating agent comprising a polyvinyl chloride powder having particles less than about 1 micron in size.

7. A free flowing, intimately admixed dry blend of (1) 100 parts by weight of a free flowing, particulate vinyl halide polymer having an average particle size larger than 75 microns but smaller than 420 microns and capable of absorbing at least 35 parts of plasticizer on particle surfaces without significant agglomeration of particles, (2) 1–60 parts of a curable epoxide and selected from (a) a polyglycidyl ether of a polyhydric aliphatic alcohol or a polyhydric phenol and (b) a cycloaliphatic epoxide, (3) up to 60 parts of a plasticizer for said vinyl halide polymer, and (4) up to 25 parts of an anti-agglomeration agent comprising a vinyl powder less than 74 microns in size, characterized by the feature that the blend includes a catalytic amount, but not more than one part, of a metal imidazolate latent catalyst and the blend also contains 0.2–2.0 equivalents, per equivalent of said epoxide, of a curing agent for the epoxide, which curing agent is selected from the group consisting of a dihydrazide, a polyacid anhydride of a polycarboxylic acid, and dicyandiamide or a derivative thereof.

8. A free flowing, intimately admixed dry blend consisting essentially of:

a free flowing, particulate polyvinyl chloride homopolymer having an average particle size in the range of 100–150 microns and capable of absorbing at least 35 parts of plasticizer on particle surfaces without significant agglomeration of particles, 5–30 parts by weight, per 100 parts by weight of said free flowing, particulate polyvinyl chloride homopolymer, of a polyglycidyl ether of bisphenol A having an epoxide functionality in the range of 1.7–2.5, about 0.4–1.0 equivalent, per epoxide equivalent of said polyglycidyl ether of bisphenol A, of an aliphatic dihydrazide, 5–35 parts by weight, per 100 parts by weight of said free flowing, particulate polyvinyl chloride homopolymer, of an oily liquid plasticizer comprising a diester of an alkanol of 1–18 carbon atoms and a dicarboxylic acid, said oily liquid plasticizer being absorbed into said free flowing particulate polyvinyl chloride homopolymer, a catalytic amount, not exceeding about one part by weight per 100 parts by weight of said free flowing particulate polyvinyl chloride homopolymer, of a metal imidazolate epoxide ring-opening catalyst, 1–10 parts, per 100 parts by weight of said free flowing particulate polyvinyl chloride homopolymer, of an organometallic vinyl stabilizer, and 0.5–10 parts by weight, per 100 parts by weight of said free flowing polyvinyl chloride homopolymer, of an anti-agglomerating agent comprising a polyvinyl chloride powder having particles less than about 1 micron in size.

* * * * *

UNITED STATES PATENT OFFICE
CERTIFICATE OF CORRECTION

Patent No. 3,819,560        Dated June 25, 1974

Inventor(s) J. Alan Kehr

It is certified that error appears in the above-identified patent and that said Letters Patent are hereby corrected as shown below:

Column 8, line 2, "(complete, preblended system" should be --(complete, preblended) system --.

Column 9, lines 32-33, "bisphenol" should be deleted.

Signed and Sealed this ninth Day of December 1975

[SEAL]

Attest:

RUTH C. MASON
Attesting Officer

C. MARSHALL DANN
Commissioner of Patents and Trademarks